United States Patent [19]

Kyronlahti et al.

[11] Patent Number: 5,452,354
[45] Date of Patent: Sep. 19, 1995

[54] RINGING TONE APPARATUS

[75] Inventors: Tapio Kyronlahti, Salo; Heikki Rautila, Espoo; Erkki Veikkolainen, Oulu; Tommi Lunden, Aura, all of Finland

[73] Assignee: Nokia Mobile Phones Ltd., Salo, Finland

[21] Appl. No.: 166,257

[22] Filed: Dec. 13, 1993

[30] Foreign Application Priority Data

Dec. 21, 1992 [FI] Finland .................. 925808

[51] Int. Cl.⁶ .................................. H04M 13/00
[52] U.S. Cl. ...................... 379/375; 379/373; 379/377; 379/252; 379/255
[58] Field of Search ............ 379/375, 373, 377, 252, 379/255, 182, 183, 175

[56] References Cited

U.S. PATENT DOCUMENTS

| | | | |
|---|---|---|---|
| 4,477,697 | 10/1984 | Judd et al. | 379/252 |
| 4,866,766 | 9/1989 | Mitzlaff | 379/374 |
| 4,962,527 | 10/1990 | Burns et al. | 379/255 |
| 5,361,296 | 11/1994 | Reyes et al. | 379/373 |

FOREIGN PATENT DOCUMENTS 4292049 10/1992 Japan ................. 379/252

OTHER PUBLICATIONS

Echo des Recherches No. 139, 1990, Issy/Molineaux, FR pp. 13–20 P. Jolle et al. "Une Application de la d'Identite d'Abonne du Radiotelephone Numerique Europeen".
Patent Abstracts of Japan vol. 12, No. 60 (E–584) 23 Feb. 1988 & JP-A-62 203 434 (NEC Corp.) 8 Sep. 1987.
Patent Abstracts of Japan vol. 11, No. 396 (E–568) 24 Dec. 1987 & JP-A-62 157 451 (NEC Corp.) 13 Jul. 1987.
Finnish Office Action issued on priority Finnish application 925808 filed 21 Dec. 1992.
English translation of Finnish Office Action.

*Primary Examiner*—Jeffery A. Hofsass
*Assistant Examiner*—Jacques M. Saint-Surin
*Attorney, Agent, or Firm*—Perman & Green

[57] ABSTRACT

The present invention relates to a method for generating the ringing tone of a phone and apparatus according to the method. A ringing tone generator (12) is controlled according to a ringing tone sequence by control circuitry (13), and subscriber identification information is stored in a fixed or a detachably connectable nonvolatile memory (10) of the phone. When the phone is switched on, the microprocessor (13) reads from a subscriber identification information memory (10) of the phone at least some of the subscriber identification information, calculates on the basis thereof the values for ringing tone parameters (1, . . . ,6) describing the ringing tone sequence, and stores them in a ringing tone parameter memory (11). When receiving a page to the phone, the control circuitry (13) reads from the ringing tone parameter memory (11) the values of the parameters (1, . . . , 6) describing the ringing tone sequence, generates a ringing tone sequence on the basis of the parameter values (1, . . . , 6) and of a program stored in the phone, and controls according there to the ringing tone generator (12), the generator now generating a ringing tone according to the ringing tone sequence. The invention is particularly appropriate for mobile phones, which usually include data, depending on the system, either about the phone number or the subscriber number (MSIN).

20 Claims, 2 Drawing Sheets

RINGING TONE APPARATUS

FIELD OF THE INVENTION

The present invention relates to ringing tone apparatus for a telephone, and a method for generating a ringing tone for a telephone.

BACKGROUND TO INVENTION

Conventional phone ringing tone alarms form a warbler tone by making a connection between two or more different frequencies at a constant speed. Said frequency values have usually been so arranged that one ringing tone only is permitted. However, in microprocessor-based phones various waveforms can be synthesized with the aid of suitable programming. A user is now able to select one waveform out of a small number of various combinations.

Patent application GB-2,183,423 discloses a system for generating a phone ringing tone for use in a subscriber means of the phone, or equivalent, comprising a ringing tone generation circuit connected to a microprocessor to control the ringing tone generation circuit by controlling the output gate connected to the input of the circuit up and down at a speed equivalent to the desired ringing tone frequency. The control of the output gate is so implemented that the on and off states are generated according to a given configuration from the ringing tone, and the parameters affecting the control of the ringing tone output are programmed into the microprocessor from the phone keyboard or equivalent, whereby the user is able to supply the frequency of the ringing tone he/she desires, or other tone of the sound. The microprocessor controls the other operations of the phone simultaneously.

For determining the frequency of the ringing tone, that is, the waveform, the user is able to program a ringing tone he/she desires by feeding in a numerical keyboard value to the phone. In addition, the user feeds other parameters to the phone to control the on/off configurations of the ringing tone. First, a "ringing tone programming" prefix is fed to the phone, followed by one or more values supplied by the user, on the basis whereof the ringing tone is determined.

Using the system disclosed in patent application GB-2,183,423 a plurality of different ringing tones can be generated, up to 2,176 different ringing tones. The system makes the use of the phone even more difficult than before because the phones, particularly mobile phones, include a great number of different operations and keys, so that the selection of a ringing tone by programming tends to make the use of the phone even more difficult, so that the user easily forgets how to use an operation because there are so many other things to remember, and it may occur that the programming of the ringing tone thus introduced is not used at all because it is forgotten or the user does not bother to learn how to do the programming.

SUMMARY OF INVENTION

A first aspect of the present invention provides ringing tone apparatus for a telephone, comprising control means for acquiring data from within said telephone and utilising said data for creating a ringing tone sequence for said telephone, and tone generating means adapted to receive said ringing tone sequence and for generating a ringing tone in accordance with said ringing tone sequence, and a second aspect of the present invention provides a method for generating a ringing tone for a telephone, comprising acquiring data from within said telephone preparatory to generating a ringing tone, creating a ringing tone sequence in accordance with said data, and inputting said ringing tone sequence to tone generating means generating said ringing tone.

These have the advantage that it is possible for the ringing tones of various phones to differ from each other and thus it is easy for a user to recognize the ringing tone of his/her own phone, and the phone will generate the ringing tone automatically so that there is no need for the user to supply any information to the phone.

Preferably, the ringing tone apparatus generates a sequence and frequency of the ringing tone according to a subscriber identification information, such as telephone number or subscriber number. Alternatively, the ringing tone sequence may be generated on the basis of a part of the subscriber identification information of the phone.

Of course there is a risk that the user does not like the tone, which is generated on the basis of a subscriber identification. Therefore this automatically generated standard tone can be replaced by a tone which the phone generates randomly or by another prestored tone. The user may invoke the tone generation function repeatedly, preferably a random tone generation function, until he or she finds a tone, which aesthetically satisfies him or her. Thereby the user may change the tone if desired and may also return to the standard tone generated automatically on the basis of a subscriber identification.

The method and phone of the invention can be used in phones including information about the phone number of the subscriber or other subscriber identification information. Such phones are e.g. mobile phones. With the exception of the German NETZ-C and the GSM mobile phone network, in all currently used mobile phone systems the telephone number has been very closely tied to a given phone means.

In the NETZ-C network, the phone number is not included in the phone means, instead, the user activates the phone by inserting a card containing numerical data into a reader in the phone. The cards are usually bank card-sized magnetic cards, or currently also smart cards including a processor.

Also in the GSM system a so-called smart card Subscriber Identity Module (SIM) is used, including data required in identifying a subscriber. According to the definition by the GSM, the phone means is called Mobile Equipment (ME) until a SIM card is connected thereto, whereby it becomes a Mobile Station (MS). By plugging in the SIM card in place the subscriber is able to activate any GSM mobile phone (i.e. mobile equipment) using the same card type into his/her use anywhere within the range of the network, and call or receive calls to his/her phone number. Thus the phone means needs a SIM card to be operated.

There are two different sizes of SIM cards: a larger one according to ISO 7816 standard, and a smaller one, so-called plug-in SIM, the first-mentioned of which being of the size of a bank card and the latter $15 \times 25$ mm$^2$ but in operation similar to the larger SIM. SIM includes e.g. encryption algorithms and data related to the network and the subscriber, particularly data associated with the identification of the subscriber.

In GSM mobile phones an International Mobile Subscriber Identity (IMSI) is used for identifying a mobile phone subscriber, the maximum length thereof being 15 symbols and composed of three different parts as follows:

$$IMSI = MCC + MNC + MSIN,$$

where the first item is the GSM Mobile Country Code, the length thereof being three numbers, next the Mobile Network Code MNC of the national GSM network of 1-2 numbers long, and finally, the Mobile Station Identification Number within the own national GSM, being at most 11 signs in length and also abbreviated as MIN (Mobile Identification Number). So, particularly the MSIN identification of the mobile phone separates the phone from the rest. However, the subscriber is not informed of the IMSI identification of his/her own (his/her phone), because it is included within the phone (in the SIM card) and it is used within the GSM network for subscriber identification, and no one is able to call that number. As regards the external network, a mobile phone subscriber is identified with the aid of the ISDN number of the subscriber, not being described in the present context in detail.

In the present invention, the generation of the sequence and frequency of the ringing tone can thus be carried out, not only according to the phone number, but also according to some other subscriber identification information, this being different for each subscriber. On the basis of said identification, or part of the identification, (e.g. on the basis of the last two numbers), a ringing tone sequence is generated. For instance, the last two numbers of a phone number can be used for the basis of the sequence and frequency of the ringing tone, whereby 100 different ringing tones can be generated. Similarly, using merely the last number of the telephone number 10 different ringing tones can be generated, and using the last three numbers, already one thousand different ringing tones can be obtained. Thus, a plurality of different ringing tones can be provided, whereby the probability that two users have a similar phone in the same mode and a similar ringing tone is very small. In theory, using the entire subscriber identification, e.g. the International Mobile Subscriber Identity, it is possible to organize so that each subscriber is provided with a different ringing tone.

DESCRIPTION OF AN EMBODIMENT OF THE INVENTION

Figure 1A:
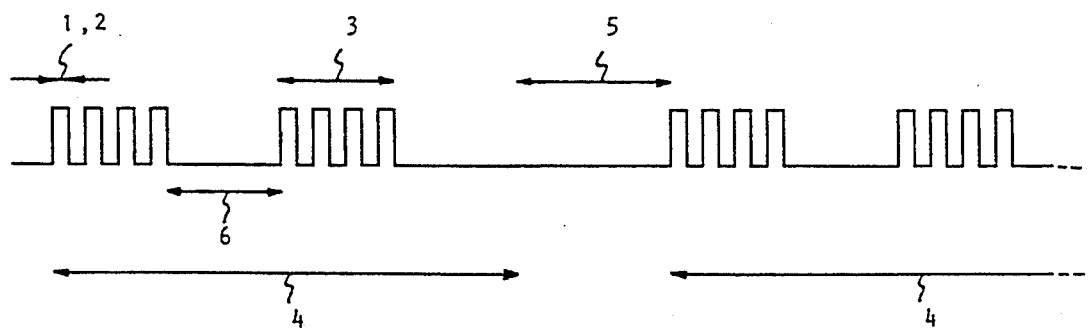
FIG. 1A presents the generation of a ringing tone sequence on the basis of different parameters.
Figure 1B:
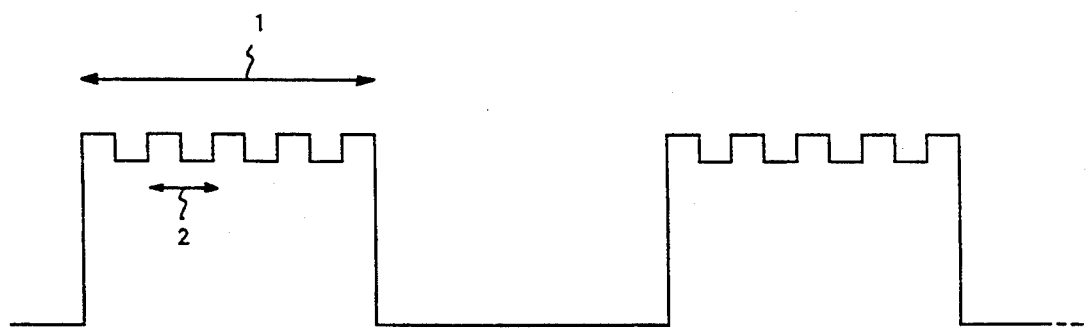
FIG. 1B presents more in detail the significance of one pulse.

FIG. 1A presents an example of a ringing tone sequence, including parameters affecting the sequence, these being described below. The ringing tone sequence may also differ in design, the sequence shown in FIG. 1A is merely one alternative. The ringing tone sequence has been generated by changing the length 1 and frequency 2 of ringing tone pulses (FIG. 1B), and on the basis of the pulse number 3 of the pulse sequences formed from pulses, on the basis of the number 4 of the pulse sequences 3 of sequence series generated from the pulse sequences 3 and the silent periods 6 between the sequences, and on the length 5 of a silent period between two sequence series 4. In the present context, the silent period 6 between the pulse sequences 3 is assumed to be of the same length as the pulse sequence 3 itself so that no parameter is generated for said silent period 6 in the example of FIG. 1. The parameter 4 describing the sequence series 4, of which an exemplary value is given below, means how many pulse sequences 3 and silent periods 6 following each pulse sequence 3 one sequence series 4 contains. Said parameter 1-5 can be changed by keeping the number of parameters the same, or the number of parameters can be increased, e.g. by adding, in addition to parameters 1-5, to become a parameter the silent period 6 between the pulse sequences 3. In FIG. 1B, the significance of the length 1 and frequency 2 of a ringing tone pulse is described more in detail. The ringing tone, digital or analog, is provided with a given frequency 2, and it is on for a given length of time 1 and off for an equal length of time (as in the present case), but the silent period may also be a separate parameter of a different length.

The values of the above mentioned parameters 1-6 can be varied to be dependent on the telephone number or a part thereof, which for processing purposes can be converted into a binary number, or dependent on the subscriber identification of the phone, or part thereof, (also as a binary number). The MSIN contained in the IMSI comprises at most 11 signs. When at a maximum, a number with 11 signs is 999 999 99999, which as a binary number is provided with 37 bits. Thereof, e.g. ten last or more bits can be used for defining the values of the parameters described above. The lowermost bits of the identification MSIN are described as follows: D10-D9-D8-D7-D6-D5-D4-D3-D2-D1-D0. Thus, the values of the parameters 1 to 5(6) can, on the basis of identity MSIN, be selected as follows:

| Parameter 1 | |
|---|---|
| D1, D0: | 00 = 20 ms |
| | 01 = 30 ms |
| | 10 = 40 ms |
| | 11 = 50 ms |
| Parameter 2 | |
| D3, D2: | 00 = 500 Hz |
| | 01 = 1000 Hz |
| | 10 = 1500 Hz |
| | 11 = 2000 Hz |
| Parameter 3 | |
| D5, D4: | 00 = 20 pulses |
| | 01 = 30 pulses |
| | 10 = 40 pulses |
| | 11 = 50 pulses |
| Parameter 4 | |
| D7, D6: | 00 = 1 pulse sequence |
| | 01 = 2 pulse sequences |
| | 10 = 3 pulse sequences |
| | 11 = 4 pulse sequences |
| Parameter 5 | |
| D9, D8: | 00 = 1 s |
| | 01 = 2 s |
| | 10 = 3 s |
| | 11 = 4 s | when ten last bits of identity MSIN are in use. If one wants to use 11 bits, the bit D10 can be used for determining the value of parameter 6, e.g. in the following way:

| Parameter 6 | |
| --- | --- |
| D10: | 0 = 2 s |
| | 1 = 3 s |

Using the above manner, in a ten bit case $2^{10}=1024$ (=4*4*4*4*4) different ringing tone sequences can be generated, and with 11 bits, $2^{11}=2048$ (=4*4*4*4*4*2) different ringing tone sequences can be generated.

Figure 2:
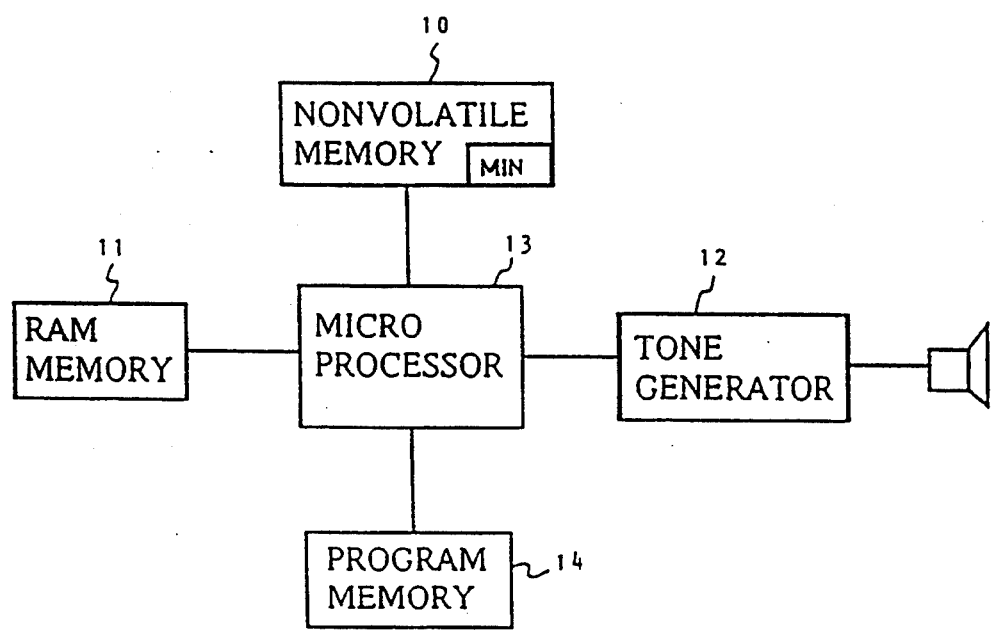
FIG. 2 presents the general block diagram of the system according to the invention.

FIG. 2 shows a block diagram of the blocks used for generating the ringing tone according to the invention. The block diagram is exemplary, and the operations according to the invention may also be implemented differently. Subscriber identification information (phone number or other subscriber identification) is stored in a nonvolatile memory 10, such as ROM memory, or other separate memory. When the phone is switched on, the subscriber identification is read from the nonvolatile memory 10, or other separate memory, on the basis whereof a ringing tone sequence is generated (i.e. the values are determined with the microprocessor for the parameters describing the ringing tone sequence). The ringing tone sequence is stored in RAM memory 11 as parameter values of the program, e.g. in the manner presented above. Also prestored sequences may be stored in the nonvolatile memory 10, so that if the user does not like the automatically generated standard tone he/she may replace it with one of the prestored tones. Also the user may replace the ringer tone with a randomly generated tone. This randomly geenrated tone can be generated in a similar manner as the standard tone as explained and shown in FIGS. 1A and 1B. Thereby the microprocessor 12 randomly generates a value for each of the parameters 1–6 of the ringer tone sequence. In order to assure that the tones are feasible for this ringer tone purpose, e.g. that the frequencies are in the optimal area for human hearing, the value for each parameter may be arranged to be randomly chosen from a set of predefined values. If using six different parameters 1–6 then already with four different predefined values for each parameter a number of $4^6=4096$ different sequencies may be generated. With five predefined values the number of different combinations would already be as high as $5^6=15625$ different sequencies. When the user chooses a randomly generated sequence, this sequence is then stored in the RAM 11 as parameters.

When a call is made to the phone, the program parameters stored in the RAM memory 11 are read and with the program the ringing tone generator 12 is controlled by means of a microprocessor 13, and on the basis of the program parameters 1–5(6), to generate a ringing tone according to the sequence. The program controls the timing of the ringing tone sequence parameters with the aid of the timer of the microprocessor 13. The ringing tone generator 12 generates a ringing tone according to the sequence until a call is answered or the caller interrupts the call so that the ringing tone ends. The microprocessor 13 controls the blocks 10,11,12,14 associated with the generation of the ringing tone, and the operations thereof, as well as other operations of the mobile phone. The program controlling the generation of the ringing tone is stored in the program memory 14. The ringing tone generator 12 may use various ringing tone generation methods known in the art, and it may comprise e.g. a dual-tone multifrequency signaling generator (DTMF), in which the ringing tone is generated by making a connection between two different frequencies. The ringing tone generator 12 functions so that it generates a tone of desired frequency (parameter 2) for the period of time it is switched on, and the microprocessor 13 controls the ringing tone generator 12 according to the on/off sequence. Instead of the ringing tone generator 12, also e.g. the system disclosed in GB patent application GB-2,183,423 can be used for generating the ringing tone, in which the microprocessor feeds the ringing tone sequence into the ringing tone generation circuit in the form of pulses.

Figure 3:
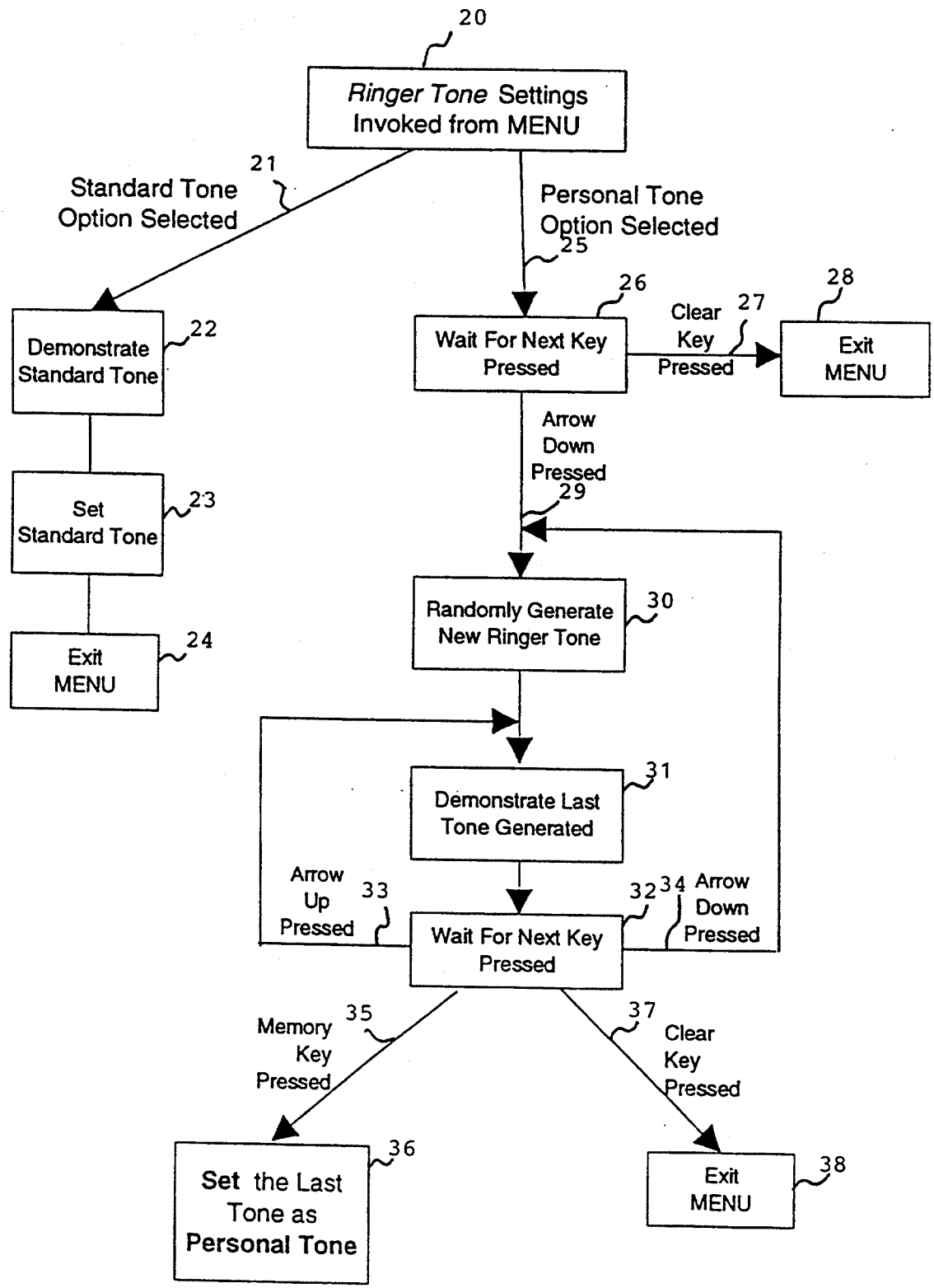
FIG. 3 presents a flow chart for selecting another tone instead of the standard tone.

A flow chart for selecting ringer tone, preferably a randomly generated tone, for the telephone is shown in FIG. 3. The basic principle is that the user randomly generates 30 a new tone by pressing 29 and arrow down key. Then the phone audibly demonstrates 31 the generated new tone. If the generated tone sounds interesting, the user can repeat the demonstration by pressing 33 arrow up key. If the demonstrated ringer tone pattern does not satisfy the user he/she can generate new tones by pressing 34 the arrow down key again. Once a satisfying new tone is found it is set 36 as the new personal tone by pressing 35 a memory or a select key. The user also has the option to exit 28, 38 the tone generation sequence without changing the ringer tone already set. The selection of new randomly generated tone can be done as many times as needed simply through visiting the ringer tone option 20 in the menu of the phone. The ringer tone option 20 also includes the option 21 of selecting the automatically generated standard tone, which can be demonstrated 22 by pressing a key, e.g. arrow down key, and set 23 by pressing the memory key. The menu can be exited 24 by pressing the clear key.

The present invention enables the identification of a call into the phone of one's own on the basis of the ringing tone even if several phones were in the same place. A different ringing tone can be generated automatically without having to program the ringing tone from the keyboard or to select with a menu. The invention is useful in telephone apparatus provided with information of the identification related to the phone, such as phone number or other subscriber-specific identification. The invention is particularly appropriate for use in mobile phones, and e.g. in the GSM phone, on the basis of the mobile phone identification MSIN, various ringing tone sequences can be implemented the number determined by the maximum value of the identification.

The invention is not restricted to the examples now presented, and it can be modified within the scope of the accompanying claims. For example, the ringing tone parameters may be input directly to tone generating circuitry responsive to such tone parameters to generate a ringing tone in accordance with the parameters, instead of being parameters in a program.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A ringing tone apparatus for a radio telephone to be used by a subscriber and for creating a distinctive ringing tone which is identifiable as relating to said subscriber, comprising
 subscriber identification memory means for storing subscriber identification data relating to said subscriber;
 control means operable to evaluate parameters from said subscriber identification data and to create a ringing tone sequence by deriving and storing ringing tone parameters in a parameter memory in said radiotelephone, said control means further operable to acquire said subscriber identification data from within said subscriber identification memory means in response to any incoming call and to utilize only said subscriber identification data as a basis for creating said ringing tone sequence from ringing tone parameters stored in said parameter memory, and
 tone generating means adapted to receive said ringing tone sequence and for generating a ringing tone in accordance with said ringing tone sequence.

2. A ringing tone apparatus as set forth in claim 1, wherein said subscriber identification data comprises only a part of subscriber identification information.

3. A ringing tone apparatus as set forth in claim 1, wherein said control means randomly generates said ringing tone sequence.

4. A ringing tone apparatus as set forth in claim 1, wherein said tone generating means is a ringing tone generator.

5. A ringing tone apparatus as set forth in claim 1, wherein said subscriber identification memory is removably connectable to said ringing tone apparatus.

6. A method for generating a ringing tone for a radio telephone which stores subscriber identification data relating to a subscriber-user of said radio telephone, comprising the steps of:
 determining ringing tone parameters solely based on said subscriber identification data;
 storing said ringing tone parameters in a ringing tone parameter memory means;
 creating a ringing tone sequence upon receipt of an incoming telephone call with subscriber identification data and in response to stored said ringing tone parameters determined from said subscriber identificaition data, and inputting said ringing tone sequence to tone generating means to generate a ringing tone that is distinctive related to said subscriber-user.

7. A method as set forth in claim 6, further comprising the step of:
 utilizing said ringing tone parameters in a control program for generating said ringing tone sequence.

8. A method as set forth in claim 6, wherein said subscriber identification data comprises only part of subscriber identification information.

9. A method as set forth in claim 6, wherein upon the telephone receiving a paging signal, control means reads from said ringing tone parameter memory means the values of said ringing tone parameters describing said ringing tone sequence,
 generates on the basis of said ringing tone parameter values and a program stored in said telephone, the ringing tone sequence,
 according to said ringing tone sequence, controls said tone generating means generating said ringing tone, and
 said tone generating means generates said ringing tone on the basis of the controls supplied thereto.

10. A method as set forth in claim 8, wherein said subscriber identification information is a telephone number of the subscriber.

11. A method as set forth in claim 10, wherein said ringing tone sequence is generated on the basis of the last number of a phone number N, where N is at least 1.

12. A method as set forth in claim 8, wherein said subscriber identification information comprises a Mobile Station Identification Number MSIN.

13. A method as set forth in claim 12, wherein said ringing tone sequence is generated on the basis of the last number of a subscriber number M, where M is at least one.

14. A method as set forth in claim 10, wherein said subscriber identification information is processed as a binary number (D10-D0) and for said ringing tone parameters the values are calculated in a predetermined manner on the basis of the bits (D10-D0) of said subscriber identification information.

15. A method according to claim 6, wherein said ringing tone sequence is generated randomly.

16. A method as set forth in claim 14, wherein said ringing tone sequence is generated from a sequence series formed from pulse sequences generated from individual pulses and from repetitions of said series at given intervals, whereby said ringing tone parameters contain a parameter describing a length of a pulse, a parameter describing a tone frequency of the pulse, a parameter describing an amount of pulses of a pulse sequence generated from a plurality of pulses, a parameter describing an amount of pulse sequences of a pulse series, and a parameter describing a length of an interval of two sequence series formed from a plurality of pulse sequences.

17. A method as set forth in claim 16, wherein said ringing tone parameters further comprise a parameter describing the length of the interval between two pulse sequences.

18. A method as set forth in claim 16, wherein a value for each ringing tone parameter is generated randomly.

19. A method as set forth in claim 18, wherein a value for each ringing tone parameter is generated randomly from a predefined number of predefined values.

20. A method as set forth in claim 10, wherein a subscriber identification information memory containing said subscriber identification information is removably connected to said ringing tone apparatus.

* * * * *